3,660,363
VULCANISABLE COPOLYMERS
Richard Gregory Foster and Paul Hepworth, Runcorn, England, assignors to Imperial Chemical Industries Limited, London, England
No Drawing. Filed July 20, 1970, Ser. No. 56,668
Claims priority, application Great Britain, July 22, 1969, 36,828/69
Int. Cl. C08f 15/40
U.S. Cl. 260—80.78      12 Claims

ABSTRACT OF THE DISCLOSURE

An amorphous high molecular weight vulcanisable copolymer of ethylene, at least one α-olefin having from 3 to 8 carbon atoms, and at least one polycyclic diene having the structure

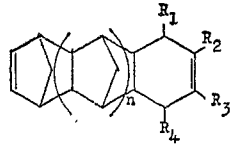

where $n$ is a whole number of at least one and each of $R_1$, $R_2$, $R_3$ and $R_4$ is either a hydrogen atom or a monovalent hydrocarbyl group, or hydrocarbyl derivatives of said polycyclic diene.

---

This invention relates to vulcanisable copolymers.

It is known that valuable polymeric materials containing vulcanisable unsaturation may be obtained by copolymerising selected non-conjugated dienes with ethylene and an α-olefin, generally propylene, in the presence of a co-ordinated anionic catalyst system.

The prime requirements for the non-conjugated diene are that it contain one double bond that is readily copolymerisable with a mixture of olefins and that the double bond which provides the unsaturated groups in the polymer be a site at which vulcanisation of the polymer may be effected rapidly to produce vulcanised products having good tensile properties. It is often the case that otherwise suitable non-conjugated dienes lack one or even both of these requirements. Frequently either the diene is readily copolymerisable with the olefin components yet yields a copolymer which is only slowly vulcanisable, as in the case of dicyclopentadiene, or the diene is only slowly copolymerisable with the olefins yet yields a copolymer which is rapidly vulcanisable, as in the case of certain straight chain dienes, e.g. 1:4-hexadiene. Many non-conjugated dienes satisfy neither of these requirements.

We have now found a new class of polycyclic non-conjugated dienes which are readily copolymerisable with ethylene and an α-olefin and which in many cases satisfies both of these prime requirements.

According to the present invention we provide an amorphous high molecular weight vulcanisable copolymer of ethylene, at least one α-olefin having from 3 to 8 carbon atoms, and at least one polycyclic diene having the structure:

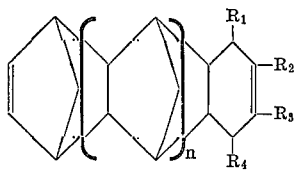

where $n$ is a whole number of at least one and each of $R_1$, $R_2$, $R_3$ and $R_4$ is either a hydrogen atom or a monovalent hydrocarbyl group, or at least one derivative of said polycyclic diene in which one or more of the carbon atoms in or forming part of the endomethylene bridged rings and not forming part of a carbon-carbon double bond carries a monovalent hydrocarbyl substituent group.

Preferably the carbon atoms in or forming part of the endomethylene bridged rings of the polycyclic diene are unsubstituted.

The production of the polycyclic diene by Diels-Alder reaction is described in our copending British application No. 36,827/69.

According to a method of preparation described therein polycyclic dienes having the structure I may be prepared by effecting Diels-Alder reaction between a substituted polycyclic monoene having the structure

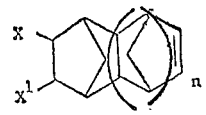

(II)

where $n$ is a whole number of at least one, and an acyclic conjugated diene having the structure

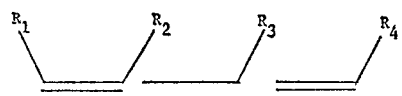

(III)

to form an intermediate having the structure

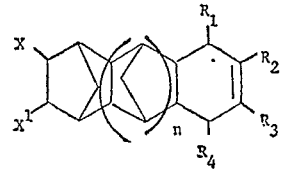

(IV)

and subsequently eliminating XX' from the intermediate, where X and X' are atoms or groups which may be eliminated from the intermediate with the formation of a double bond between the carbon atoms to which X and X' were attached.

Diels-Alder reaction of the substituted polycyclic monoene with the acyclic conjugated diene to form the intermediate may be effected at elevated temperature and pressure preferably in the absence of air and moisture, for example, in the presence of an inert gas, e.g. nitrogen. Inert diluents may be present, if desired. Temperatures in the range 50° C. to 300° C., preferably 150° C. to 250° C., and pressures up to 100 atmospheres, suitably the autogenous pressure of the reactants, may be used. It is preferred to effect the reaction in the presence of an excess of the substituted polycyclic monoene, for example at a molar proportion of substituted polycyclic monoene to acylic conjugated diene in the range 2:1 to 5:1, if the by-production of unduly large concentrations of dimers of the acyclic conjugated diene is to be minimised.

The nature of X and X' is such that the compound XX' may be eliminated from the intermediate with the formation of a double bond between the carbon atoms to which X and X' were attached. For example, one of X and X' may be hydrogen and the other may be hydrogen or an ester group derived from a lower alkanoic acid containing, for example, up to six carbon atoms.

The elimination of XX' from the intermediate may be effected in a number of ways, for example, pyrolytically, catalytically, electrolytically, or by chemical reaction, the method chosen depending on the nature of the groups X and X'. For example, where one of X and X' is hydrogen and the other is halogen, e.g. chlorine, XX' may be eliminated by reaction with a base. Suitable bases include, for example alkali metal alkoxides, for example, a potassium or sodium alkoxide, e.g. potassium tertiary butoxide or sodium tertiary butoxide.

The reaction of the intermediate with the base is preferably effected at elevated temperature, if desired, in the presence of an inert diluent, for example at the reflux temperature of the diluent. Alternatively, the reaction may be effected in a sealed pressure vessel, if desired in the presence of an inert diluent, and preferably at a temperature in the range 150° C. to 250° C.

The substituted polycyclic monoene may in turn be prepared by Diels-Alder reaction of cyclopentadiene with either an olefin of the structure $$XCH=CHX' \qquad V$$

or with a substituted norbornene of the structure (VI)

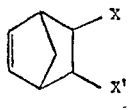

under substantially similar conditions to those used in the reaction of the substituted polycyclic monoene with the acyclic conjugated diene. An olefin which may suitably be used is vinyl chloride to give a substituted polycyclic monoene in which one of X and X' is hydrogen and the other is chlorine.

The value of n in the substituted polycyclic monoene will be determined by the relative properties of cyclopentadiene and substituted norbornene or olefin used in the preparation; in order to prepare a high proportion of substituted polycyclic monoene in which $n$ is 1 we have found that a molar proportion of cyclopentadiene to substituted norbornene in the range 0.75:1 to 1.25:1 or a molar proportion of cyclopentadiene to olefin in the range 1.75:1 to 2.25:1 is suitable.

It will be appreciated that in the Diels-Alder reactions described herein dicyclopentadiene may be used in place of cyclopentadiene provided the temperature of reaction is above the temperature at which dicyclopentadiene dissociates to cyclopentadiene at a rate which is faster than the reverse reaction. Moreover, in order to prepare derivatives of polycyclic dienes of structure I in which one or more of the carbon atoms in or forming part of the endomethylene bridged rings and not forming part of a carbon-carbon double bond carries a monovalent hydrocarbyl substituent group it will be necessary to use an appropriately hydrocarbyl substituted cyclopentadiene in the preparation of the substituted polycyclic monoene for use in the process.

It will be noted that the polycyclic dienes having the structure I above have an unsubstituted double bond in an endomethylene bridge six membered ring which double bond is readily copolymerisable with ethylene and an α-olefin.

Where any of the groups $R_1$, $R_2$, $R_3$ and $R_4$ is a hydrocarbyl group it may be an alkyl, cycloalkyl, aryl, alkaryl or aralkyl group. It is to be understood that the term alk(yl) also includes cycloalk(yl). Examples of suitable hydrocarbyl groups include alkyl groups, for example, alkyl groups having from 1 to 8 carbon atoms, e.g. methyl, ethyl, propyl and butyl. Other suitable hydrocarbyl groups include, for example, phenyl, tolyl, benzyl and cyclohexyl.

On account of the relative ease of preparation and purification of the polycyclic dienes it is preferred that $n$ in the structure I above is a whole number of from 1 to 3, preferably 1. If desired, the copolymers of our invention may be formed from mixtures of dienes having differing values of $n$.

Because of their highly useful copolymerisation activity with α-olefins without premature cross-linking and the relatively rapid rate at which the copolymers thereby obtained may be vulcanised it is preferred that the copolymers of our invention be formed from a polycyclic diene in which at least one of the groups $R_2$ and $R_3$ is an alkyl group and the other is a hydrogen atom. In this case the nature of the groups $R_1$ and $R_4$ is not critical, they may each be a hydrogen atom or alternatively one or both may be a hydrocarbyl group. If desired both $R_2$ and $R_3$ may be alkyl groups and $R_1$ and $R_4$ both hydrogen atoms. Suitably the alkyl group may be methyl.

Other polycyclic dienes for use in the formation of copolymers of our invention which may be mentioned in particular on account of the relative ease of their preparation and the availability of the starting materials from which they may be prepared are polycyclic dienes of structure I in which the groups $R_1$, $R_2$, $R_3$ and $R_4$ are hydrogen atoms and polycyclic dienes in which one or the groups $R_1$ and $R_4$ is an alkyl group, suitably a methyl group and the other is a hydrogen atom, and $R_2$ and $R_3$ are hydrogen atoms.

Examples of α-olefins suitable for copolymerisation with ethylene in accordance with the invention include propylene, butene-1, pentene-1, 2-methyl pentene-1, 4-methyl pentene-1, hexene-1, heptene-1, octene-1 and 3,5,5-trimethyl pentene-1. Propylene is preferred because of its availability and the properties of the products derived from it.

In general, we prefer our copolymers to contain at least 10% by weight of each of ethylene and α-olefin and at least 1% by weight of polycyclic diene. More preferably the copolymer contains at least 30% by weight of each of ethylene and α-olefin and from 1% to 15% by weight, preferably 2% to 10% by weight, of polycyclic diene.

The polycyclic dienes for use in the formation of the copolymers of our invention may be prepared by Diels-Alder reaction as hereinbefore described. In preparing the substituted polycyclic monoene for use in the aforementioned process by the reaction of cyclopentadiene with an olefin substantial amounts of substituted norbornene may also be formed. Also, if the alternative reaction of cyclopentadiene with a substituted norbornene is used, substantial amounts of the latter may remain unreacted. If desired, the substituted polycyclic monoene may be separated from the synthesised (or unreacted) substituted norbornene before use in the further stages of the process. However, by using the mixture of substituted polycyclic monoene and the substituted norbornene in the further stages of the process a mixture of polycyclic dienes of structure I in which $n$ is a whole number of at least one and $n$ is also zero may be produced. This mixture of polycyclic dienes may be used in the production of vulcanisable olefin copolymers and according to a further embodiment of our invention we provide a high molecular weight amorphous vulcanisable copolymer of ethylene, at least one α-olefin having from 3 to 8 carbon atoms, and a mixture of polycyclic dienes comprising (1) From 1% to 99% by weight of at least one polycyclic diene having the structure

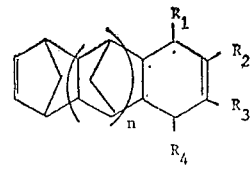

where $n$ is a whole number of at least one and each of $R_1$, $R_2$, $R_3$ and $R_4$ is either a hydrogen atom or a monovalent hydrocarbyl group, and (2) from 99% to 1% by weight of at least one polycyclic diene of the structure I in which $n$ is zero, or derivatives of said polycyclic dienes in which one or more of the carbon atoms in or forming part of the endomethylene bridged rings and not forming part of a carbon-carbon double bond carries a monovalent hydrocarbyl substituent group.

Preferably the carbon atoms in or forming part of the endomethylene bridged rings of the polycyclic dienes are unsubstituted.

Suitably the mixture of polycyclic dienes may comprise from 10% to 90% by weight of (1) and from 90% to 10% by weight of (2).

Our copolymers may be prepared by copolymerising at least one of our polycyclic dienes with ethylene and at least one α-olefin containing from 3 to 8 carbon atoms in the presence of an anionic co-ordination catalyst. Suitably a halogen-containing anionic co-ordination catalyst comprising a compound of a metal of Group Vb of the Periodic Table of the Elements and a metal of Group Ia, II or IIIa of the Periodic Table of the Elements, or an alloy hydride, complex hydride or organo-metallic compound thereof may be used, the two components being chosen such that at least one contains halogen, generally chlorine or bromine. The Periodic Table of the Elements referred to is that on the inside back cover of the Handbook of Chemistry and Physics, 49th edition, published by the Chemical Rubber Company.

The preferred group Vb metal compounds are compounds of vanadium, although niobium and tantalum compounds may also be used.

Of the metals of Groups Ia, II and IIIa, aluminium is much preferred, especially in the form of organo-aluminium compounds, although others that may be mentioned include lithium and beryllium. For example, there may be used trialkyls, dialkyl monohalides, monoalkyl dihalides, or sesqui-halides of aluminium. Suitable examples include aluminium triethyl, aluminium triisobutyl, aluminium trihexyl aluminium diethyl monochloride, aluminium ethyl dichloride and aluminium sesquichloride.

The metal compounds of Group Vb are preferably soluble in the polymerisation medium and are generally halides or oxyhalides, e.g. vanadium tetrachloride, vanadium oxychloride and vanadium tetrabromide, or compounds wherein at least one of the vanadium valencies is satisfied by an oxygen or nitrogen atom linked to an organic group, e.g. the triacetylacetonate of vanadium.

Particular examples of suitable catalyst systems are aluminium diethyl chloride with vanadium triacetylacetonate, vanadium tetrachloride, or vanadium oxytrichloride, aluminium tri(n-hexyl) with vanadium tetrachloride, and aluminium triisobutyl with vanadium oxytrichloride.

Preferably, the catalyst components are wholly dissolved, highly dispersed or amorphous colloidally dispersed in the polymerisation medium.

The activity of the anionic co-ordination catalyst system varies according to the molar ratio of the compounds employed and the optimum ratio depends upon the choice of individual catalyst components. For example, as a general rule if aluminium trialkyls are used with vanadium halides or oxyhalides the preferred ratio will be in the range 1:1 to 20:1 and generally 2:1 to 4:1. The preferred ratios are different if aluminium dialkyl halides are used in place of the trialkyls; for example, with vanadium triacetylacetonate the best results are usually obtained using a 4:1 to 10:1 molar ratio. The preferred molar ratio for aluminium diethyl chloride with vanadium tetrachloride is about 5:1 while that for aluminium triisobutyl with vanadium oxychloride is about 2:1.

The polymerisation may be carried out in the presence of a diluent which may be a hydrocarbon or a mixture of hydrocarbons, e.g. n-hexane, n-heptane, toluene, xylene and mixtures thereof. However, the polymerisation may also be effected in the absence of such diluents by using at least one of the comonomers, e.g. the α-olefin, in liquid form. The temperature chosen for the polymerisation will depend upon the nature of the catalyst components and the choice of monomers but will generally be in the range −50° C. to +60° C. Where high molecular weight polymers are desired and a catalyst system comprising vanadium and aluminium compounds is used, it is preferred to effect the polymerisation, and preferably to prepare the catalyst also, at a temperature below +10° C.

If desired, the polymerisation system may be pressurised, e.g. by ethylene or a mixture of the ethylene and α-olefin where the latter is also gaseous. Constant pressure conditions may be maintained by feeding ethylene, or the mixture of ethylene and gaseous α-olefin, into the system at the rate which is substantially the same as the rate at which they are used up in the polymerisation.

An oxygen-free atmosphere is desirable to avoid de-activation of the catalyst system and the polymerisation may be effected in an atmosphere composed of the gases of the monomers to be polymerised, or, if desired, in an atmosphere of an inert gas, e.g. nitrogen.

In order that the copolymer may have particularly desirable properties after vulcanisation, e.g. high tensile strength and modulus, it is preferred to obtain the most random distribution of the comonomer units, and in particular of the diene units, throughout the polymer chains. This may be achieved by the use of a continuous polymerisation process wherein a mixture of the monomers of constant or substantially constant composition is continuously fed into the reaction vessel at high space velocities, and if desired, recirculated. Alternatively, a mixture of the monomers may be fed into the reaction vessel at a rate substatnially the same as the rate at which they are incorporated into the polymer. In a continuous process, catalyst components may be fed continuously into the polymerisation zone.

On completion of polymerisation, the catalyst may be de-activated and the polymer solution may be removed and treated to remove catalyst residues. The polymer may then be separated, e.g. by precipitation into a non-solvent therefore, washed and dried.

The amorphous polymeric products obtained from the compolymerisation of our polycyclic dienes with ethylene and α-olefins are rubbery unsaturated materials which may be vulcanised unsing the methods normally employed for unsaturated rubbers and may be used in applications, e.g. in the formation of shaped articles, where synthetic rubbers have been used hitherto. Before vulcanisation they may be mixed with plasticisers, fillers and pigments and vulcanisation catalysts and other additives commonly used with such materials.

Our invention is now illustrated by the following examples in which all parts are expressed as parts by weight.

EXAMPLE 1

A stainless steel autoclave was flushed with nitrogen, and charged with 186 parts of dicyclopentadiene and 325 parts of vinyl chloride. The autoclave was then sealed, heated to a temperature of 190° C., maintained at this temperature for 3 hours, allowed to cool to room temperature and vented, and the unreacted vinyl chloride allowed to evaporate.

The contents of the autoclave were charged to a distillation apparatus and distilled through a 2 ft. silvered, vacuum jacketed column packed with glass helices. An initial fraction distilling at temperatures up to 50° C. at 15 mm. Hg pressure was discarded and two further fractions were collected; 70.5 parts of norbornenyl chloride distilling at 52° C. at 15 mm. Hg pressure and 49 parts of

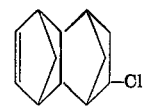

distilling in the range 140° C. to 148° C. at 15 mm. Hg pressure. 13.5 parts of undistilled residue remained in the distillation flask.

If desired the fractions containing norbornenyl chloride and could have been combined and the mixture used in the further stages of the synthesis and the mixture of products so obtained used in the subsequent copolymerisation. However, in this example the norborneyl chloride was discarded.

A stainless steel autoclave was flushed with nitrogen and charged with 224 parts of

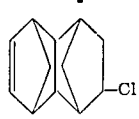

and 40 parts of isoprene. The autoclave was sealed, heated to a temperature of 170° C., maintained at this temperature for 3 hours and thereafter allowed to cool and the contents of the autoclave charged to a distillation apparatus and distilled through a 2 ft. silvered vacuum jacketed column packed with glass helices.

13 parts of an initial fraction distilling at temperatures up to 118° C. at 7 mm. Hg pressure was discarded and three further fractions were collected; 117 parts of unreacted

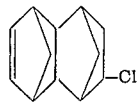

distilling at 118° C., to 135° C. at 7 mm. Hg pressure (mainly 125° C.), 30 parts of a fraction distilling at 135° C. to 162° C. at 7 mm. Hg pressure and 46.5 parts of

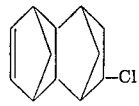

wherein one of the groups X and X' is hydrogen and the other is chlorine, distilling at 162 to 195° C. at 7 mm. Hg pressure (mainly 192° C.).

44 parts of

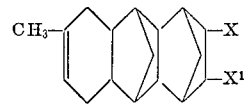

wherein one of the groups X and X' is hydrogen and the other is chlorine, were charged to a flask fitted with a stirrer and reflux condenser and were heated to a temperature of 200° C. 16 parts of potassium tertiary butoxide were gradually added to the flask over a period of 30 minutes. After the addition had been completed the contents of the flask were allowed to cool and were poured into water and extracted three times with ether. The ether extract was dried by standing over anhydrous sodium sulphate for 2 hours. The ether was then evaporated and the residue distilled through a 2 ft. Vigreux column and 13 parts of the diene

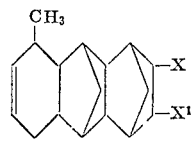

distilling in the range 160° C. to 190° C. at 8 mm. Hg pressure were collected and analysed and identified by nuclear magnetic resonance spectroscopy.

The polymerisation appartus comprised a flanged-neck flask provided with tubes for feeding and discharging gases, a stirrer, a thermometer and a serum cap through which the diene and catalysts could be introduced. The tube for introducing the gases reached the bottom of the vessel and the apparatus was kept at a constant temperature of −20° C.

The flask was filled half full with 684 parts of anhydrous heptane which was then saturated at −20° C. by passing through it for 15 minutes a mixture of propylene and ethylene in a molar ratio of 4:1. The flow rate of the gas mixture was equivalent to 8.5 times the total volume of the solvent in the flask per minute. The flow of the gas mixture was continued and 3.2 parts of the diene

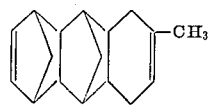

prepared above were then introduced into the apparatus followed by 0.603 part of diethyl aluminium chloride as a solution in about 1.03 parts of heptane and 0.193 part of vanadium tetrachloride as a solution in about 2.0 parts of heptane and polymerisation commenced immediately. After a polymerisation period of 15 minutes, 7.93 parts of methanol were added to deactivate the catalyst and the polymer solution was washed with dilute HCl to remove catalyst residues. The polymer was precipitated by addition of the solution to an excess of methanol. It was then spread out on a tray and dried overnight in a vacuum oven. 76 parts of polymer were obtained. The intrinsic viscosity of the polymer, measured at 30° C. on a solution of the polymer in chloroform, was 2.43 dl. gm.$^{-1}$.

100 parts of the polymer were then compounded on a laboratory roll mill with 1.5 parts of sulphur, 5 parts of zinc oxide, 1 part of stearic acid, 1.5 parts of tetramethyl thiuram monosulphide, 0.5 part of mercaptobenzothiazole and 50 parts of HAF carbon black and a small sample of the thus compounded polymer was vulcanised in a Wallace-Shawbury Curometer. The Curometer indicated that a time of 21½ minutes at 160° C. was required to achieve 95% of the maximum cure. The remaining compounded polymer was cured for 21½ minutes in a hydraulic press at 160° C. to form a ⅛ inch thick sheet.

Standard dumbbell-shaped specimens having between the shoulders a neck 1 inch long and ⅙ inch wide were cut from the cured sheet. The tensile strength at break, the modulus, and the elongation to break of each specimen were measured on a Type E tensometer using a rate of elongation of 20±2 inches/minute.

Tensile strength—1750 lb./sq. in.
300% modulus—1075 lb./sq. in.
Elongation to break—550%.

EXAMPLE 2

The polymerisation procedure of Example 1 was repeated except that 2.12 parts of the diene as used in Example 1, 0.302 part of diethyl aluminium chloride as a solution in about 0.52 part of heptane and 0.097 part of vanadium tetrachloride as a solution in about 1.0 part of heptane were used.

The polymerisation was continued for 15 minutes and 32 parts of polymer were obtained having an intrinsic viscosity, measured at 30° C. on a solution of the polymer in chloroform, of 3.64 dl. gm.$^{-1}$.

100 parts of the polymer were compounded following the procedure of Example 1. Testing on the Curometer indicated a time to 95% of the maximum cure of 12 minutes at 160° C. Separate samples of the compounded polymer were cured under pressure in a hydraulic press at 160° C. for 10, 15 and 20 minutes respectively to form ⅛ inch thick sheets.

The properties of the cured sheets are shown in the following table.

| Cure time, minutes | Temperature, ° C. | 300% modulus, lb./sq. in. | Percent elongation at break | Tensile strength, lb./sq. in. |
| --- | --- | --- | --- | --- |
| 10 | 160 | 698 | 882 | 2,600 |
| 15 | 160 | 785 | 840 | 2,770 |
| 20 | 160 | 845 | 747 | 2,630 |

EXAMPLE 3

The polymerisation procedure of Example 2 was repeated except that 5 minutes after the introduction of the second of the catalyst components, i.e. the solution of vanadium tetrachloride in heptane, a further 1.27 parts of the diene as used in Example 1 were introduced into the polymerisation medium.

The polymerisation was continued for a total of 15 minutes and 27 parts of polymer were obtained having an intrinsic viscosity, measured at 30° C. on a solution of the polymer in chloroform, of 3.60 dl. gm.$^{-1}$.

100 parts of the polymer were compounded following the procedure of Example 1. Testing on the Curometer indicated a time to 95% of the maximum cure of 10 minutes at 160° C. Separate samples of the compounded polymer were cured under pressure in a hydraulic press at 160° C. for 10 and 15 minutes respectively to form ⅛ inch thick sheets.

The properties of the cured sheets are shown in the following table.

| Cure time, minutes | Temperature, °C. | 300% modulus, lb./sq. in. | Percent elongation at break | Tensile strength, lb./sq. in. |
|---|---|---|---|---|
| 10 | 160 | 751 | 877 | 3,005 |
| 15 | 160 | 827 | 800 | 3,010 |

EXAMPLE 4

A stainless steel autoclave was flushed with nitrogen and charged with 175 parts of

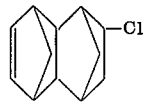

and 37 parts of dimethyl butadiene. The autoclave was sealed, heated to a temperature of 190° C. maintained at this temperature for 3 hours and thereafter allowed to cool, and the contents of the flask charged to a distillation apparatus and distilled following the procedure described in Example 1. After removal of lower boiling fractions 52.4 parts of

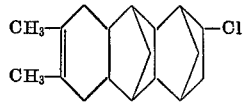

distilling in the range 165° C. to 170° C. at 1 mm. Hg pressure were collected.

3.45 parts of sodium and 118 parts of tertiary butanol were charged to a rocking autoclave which was then flushed with nitrogen, sealed, and heated at a temperature of 150° C. for 3 hours. The autoclave was then allowed to cool and was vented and charged with 25 parts of

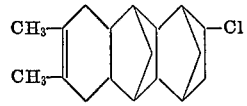

The autoclave was flushed with nitrogen, sealed and heated at a temperature of 200° C. for 2 hours.

After allowing the autoclave to cool the contents were distilled through a 2 ft. long Vigreux column and 10.1 parts of the diene

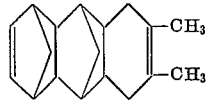

distilling in the range 120° C. to 130° C. at 1 mm. Hg pressure were collected and analyzed and identified by nuclear magnetic resonance spectroscopy.

The polymerisation procedure of Example 1 was repeated except that 2.12 parts of the diene

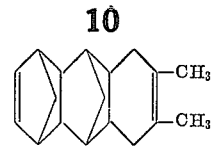

were used in place of the diene used in Example 1.

The polymerisation was continued for 15 minutes and 33.4 parts of polymer were obtained.

100 parts of the polymer were compounded following the procedure of Example 1. Testing on the Curometer indicated a time to 95% maximum cure of 16 minutes at 150° C.

Separate samples of the compounded polymer were cured under pressure in a hydraulic press at 160° C. for 8 and 13 minutes to form ⅛ inch thick sheets.

The properties of the cured sheets are shown in the following table.

| Cure time, minutes | Temperature, °C. | 300% modulus, lb./sq. in. | Percent elongation at break | Tensile strength, lb./sq. in. |
|---|---|---|---|---|
| 8 | 160 | 1,135 | 600 | 2,425 |
| 13 | 160 | 1,200 | 590 | 2,590 |

By way of comparison the polymerisation procedure described above was followed in two separate experiments except that the diene used above was replaced by respectively 1.91 parts and 3.5 parts of dicyclopentadiene.

Each polymerisation was continued for 15 minutes and respectively 21.2 parts and 19.5 parts of polymer were obtained.

100 parts of each of the polymers were separately compounded following the procedure of Example 1. Testing on the Curometer indicated times to 95% of the maximum cure of respectively 40 minutes and 38 minutes at 150° C.

Samples of the compounded polymer produced in the first of the above experiments were cured under pressure following the above procedure and the properties of the cured sheets are shown in the following table.

| | |
|---|---|
| Cure time minutes | 20 |
| Temperature ° C. | 160 |
| 300% modulus lb./sq. in. | 750 |
| Percent elongation to break | 700 |
| Tensile strength lb./sq. in. | 1980 |

EXAMPLE 5

The procedure used in Example 4 to prepare the diene was followed except that 129.7 parts of

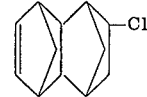

and 22.7 parts of piperylene (in place of the dimethyl butadiene used in Example 4) were heated in an autoclave at a temperature of 190° C. for 3 hours and the contents of the autoclave were distilled and 30 parts of

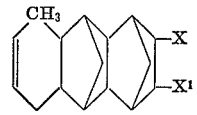

where one of X and $X^1$ is hydrogen and the other is chlorine, distilling in the range 145° C. to 150° C. at 1 mm. Hg pressure were collected.

3.45 parts of sodium and 118 parts of tertiary butanol were charged to an autoclave and heated as described in Example 4, 25 parts of

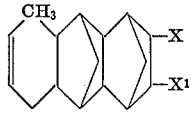

were then charged to the autoclave, the contents of the autoclave were heated and distilled following the procedure described in Example 4, and 9.5 parts of the diene

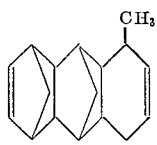

distilling in the range 98° C. to 103° C. at 1 mm. Hg pressure were collected and analysed and identified by nuclear magnetic resonance spectroscopy.

The polymerisation procedure of Example 1 was repeated except that 2.12 parts of the diene

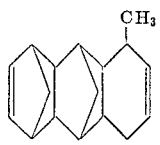

were used in place of the diene used in Example 1.

The polymerisation was continued for 15 minutes and 23.6 parts of polymer were obtained.

100 parts of the polymer were compounded following the procedure of Example 1. Testing on the Curometer indicated a time to 95% of maximum cure of 28 minutes at 150° C.

Separate samples of the compounded polymer were cured under pressure in a hydraulic press at 160° C. for 14 and 19 minutes respectively to form ⅛ inch thick sheets.

The properties of the cured sheets are shown in the following table.

| Cure time, minutes | Temperature, ° C. | 300% modulus, lb./sq. in. | Percent elongation at break | Tensile strength, lb./sq. in. |
|---|---|---|---|---|
| 14 | 160 | 1,330 | 500 | 2,300 |
| 19 | 160 | 1,420 | 470 | 2,330 |

What we claim is:

1. An amorphous high molecular weight vulcanisable copolymer of at least 10% by weight of ethylene, at least 10% by weight of at least one α-olefin having from 3 to 8 carbon atoms, and at least one polycyclic diene selected from the group consisting of polycyclic dienes having the structure

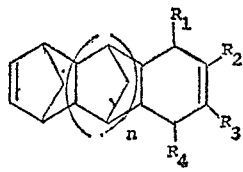

where $n$ is a whole number in the range 1 to 3 and $R_1$, $R_2$, $R_3$ and $R_4$ are selected from the group consisting of hydrogen atoms and monovalent hydrocarbyl groups, and derivatives of said polycyclic dienes in which at least one of the carbon atoms in or forming part of the endomethylene bridged rings and not forming part of a carbon-carbon double bond carries a monovalent hydrocarbyl substituent group.

2. A copolymer as claimed in claim 1 in which the carbon atoms in or forming part of the endomethylene bridged rings of the polycyclic diene are unsubstituted.

3. A copolymer as claimed in claim 1 in which the groups $R_1$, $R_2$, $R_3$ and $R_4$ in the polycyclic diene are selected from the group consisting of hydrogen atoms and alkyl groups.

4. A copolymer as claimed in claim 1 in which $n$ in the polycyclic diene is one.

5. A copolymer as claimed in claim 1 in which in the polycyclic diene one of $R_2$ and $R_3$ is an alkyl group and the other is a hydrogen atom, and $R_1$ and $R_4$ are hydrogen atoms.

6. A copolymer as claimed in claim 1 in which in the polycyclic diene $R_2$ and $R_3$ are alkyl groups and $R_1$ and $R_4$ are hydrogen atoms.

7. A copolymer as claimed in claim 1 in which in the polycyclic diene one of $R_1$ and $R_4$ is an alkyl group and the other is a hydrogen atom, and $R_2$ and $R_3$ are hydrogen atoms.

8. A copolymer as claimed in claim 1 in which in the polycyclic diene the groups $R_1$, $R_2$, $R_3$ and $R_4$ are hydrogen atoms.

9. A copolymer as claimed in claim 1 which contains from 1 to 15% by weight of polycyclic diene.

10. A copolymer as claimed in claim 1 in which the α-olefin is propylene.

11. An amorphous vulcanisable high molecular weight copolymer of at least 10% by weight of ethylene, at least 10% by weight of at least one α-olefin having from 3 to 8 carbon atoms, and a mixture of polycyclic dienes comprising (i) from 1% to 99% by weight of at least one polycyclic diene having the structure

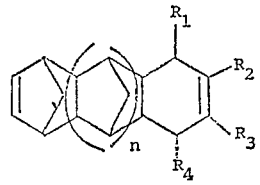

where $n$ is a whole number in the range 1 to 3 and $R_1$, $R_2$, $R_3$ and $R_4$ are selected from the group consisting of hydrogen atoms and monovalent hydrocarbyl groups, and (ii) from 99% to 1% by weight of a polycyclic diene of structure I in which $n$ is zero, or derivatives of said polycyclic dienes in which one or more of the carbon atoms in or forming part of the endomethylene bridged rings and not forming part of the carbon-carbon double bond carries a monovalent hydrocarbyl substituent group.

12. A copolymer as claimed in claim 11 in which in the polycyclic dienes the carbon atoms in or forming part of the endomethylene bridged rings are unsubstituted.

References Cited
UNITED STATES PATENTS

| 3,322,735 | 5/1967 | Loveless | 260—80.78 |
| 3,418,299 | 12/1968 | Benedikter | 260—85.3 |

JOSEPH L. SCHOFER, Primary Examiner

R. S. BENJAMIN, Assistant Examiner